US006993487B2

(12) United States Patent
Bluvband

(10) Patent No.: US 6,993,487 B2
(45) Date of Patent: Jan. 31, 2006

(54) SOFTWARE CODE COMMENTS MANAGEMENT METHOD AND SYSTEM SUPPORTING SPEECH RECOGNITION TECHNOLOGY

(75) Inventor: Max Bluvband, Rishon Le-zion (IL)

(73) Assignee: Maxima Blue Ltd., Rishon Lezion (IL)

( * ) Notice: Subject to any disclaimer, the term of this patent is extended or adjusted under 35 U.S.C. 154(b) by 678 days.

(21) Appl. No.: 10/079,524

(22) Filed: Feb. 22, 2002

(65) Prior Publication Data

US 2003/0163323 A1 Aug. 28, 2003

(51) Int. Cl.
*G10L 15/22* (2006.01)
*G10L 15/20* (2006.01)
*G06F 9/44* (2006.01)

(52) U.S. Cl. ............... 704/275; 704/251; 704/270; 717/124; 717/125; 717/128

(58) Field of Classification Search ............... 704/270, 704/275, 235, 251; 364/443; 395/575; 717/100, 717/124, 134, 125, 127, 128; 700/94; 701/200
See application file for complete search history.

(56) References Cited

U.S. PATENT DOCUMENTS 5,559,707 A * 9/1996 DeLorme et al. ........... 701/200

6,820,055 B2 * 11/2004 Saindon et al. ............. 704/235

OTHER PUBLICATIONS

Andrew Y. Yao, Searching through Source Code using CVS Comments, 2001, IEEE Computer Siciety, pp. 364-373.*
Weinstein, Josh, Speak to your Computer, Nov. 1998, Pharmaceutical Executive, v18n11, p. 130, 131 ☐☐☐☐☐☐.*
J. j. Cadiz et al, Using Web annotations for asynchronous collaboration around documents, 2000, ACM Press, pp. 309-318.*

* cited by examiner

Primary Examiner—Talivaldis Ivars Smits
Assistant Examiner—Abdelali Serrou
(74) Attorney, Agent, or Firm—Mark M. Friedman

(57) ABSTRACT

A system and method for enabling audio comments to be used when writing and executing code, during design time and run time. A code writer is hereby enabled to simultaneously write code and compose voice comments. These comments, divided into help comments, test items and variable comments, are subsequently recorded, stored, analyzed, prescribed and displayed using text to speech and voice recognition software. It is therefore possible to define test cases, execute vocal follow up on changes, and listen to comments and variables values, while running a program

2 Claims, 5 Drawing Sheets

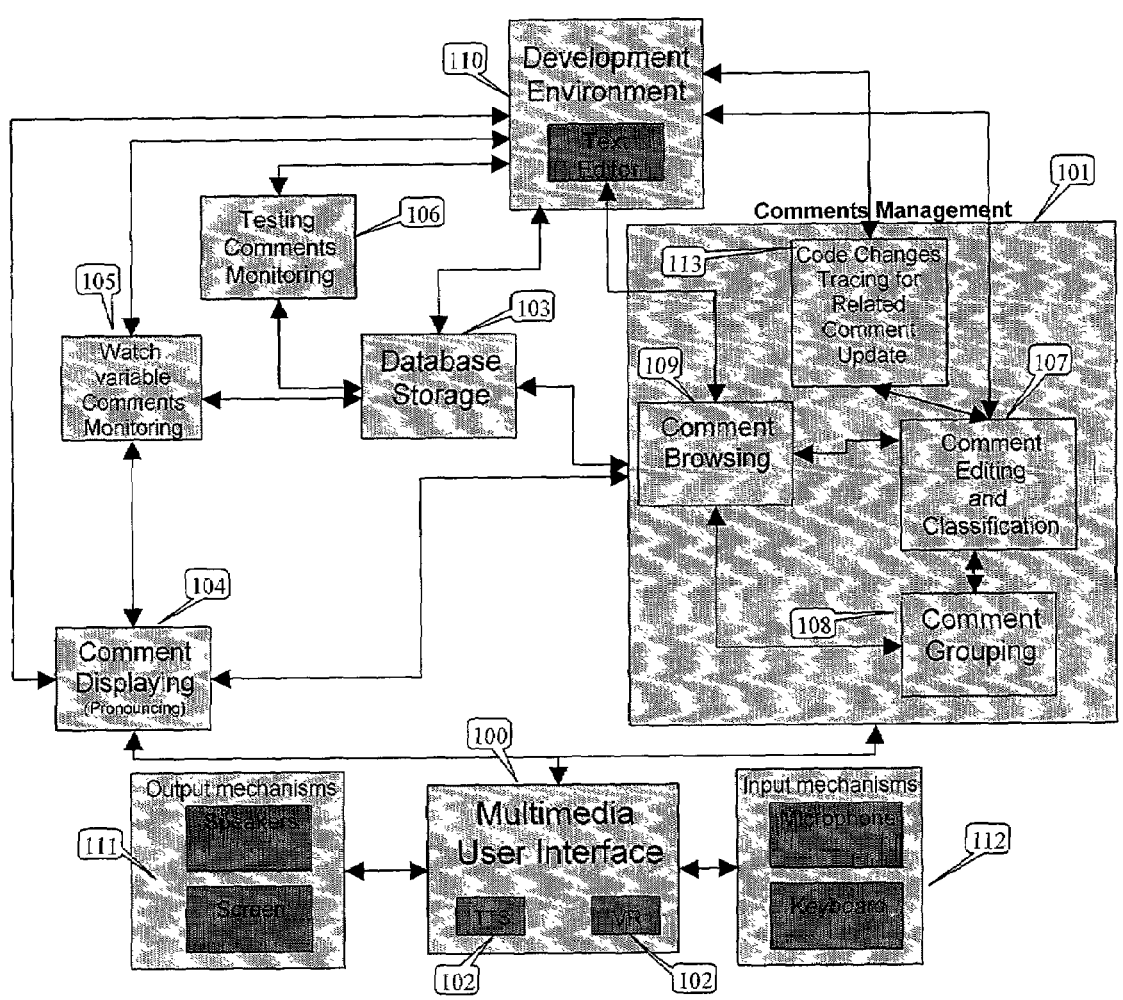
Figure 1: Components

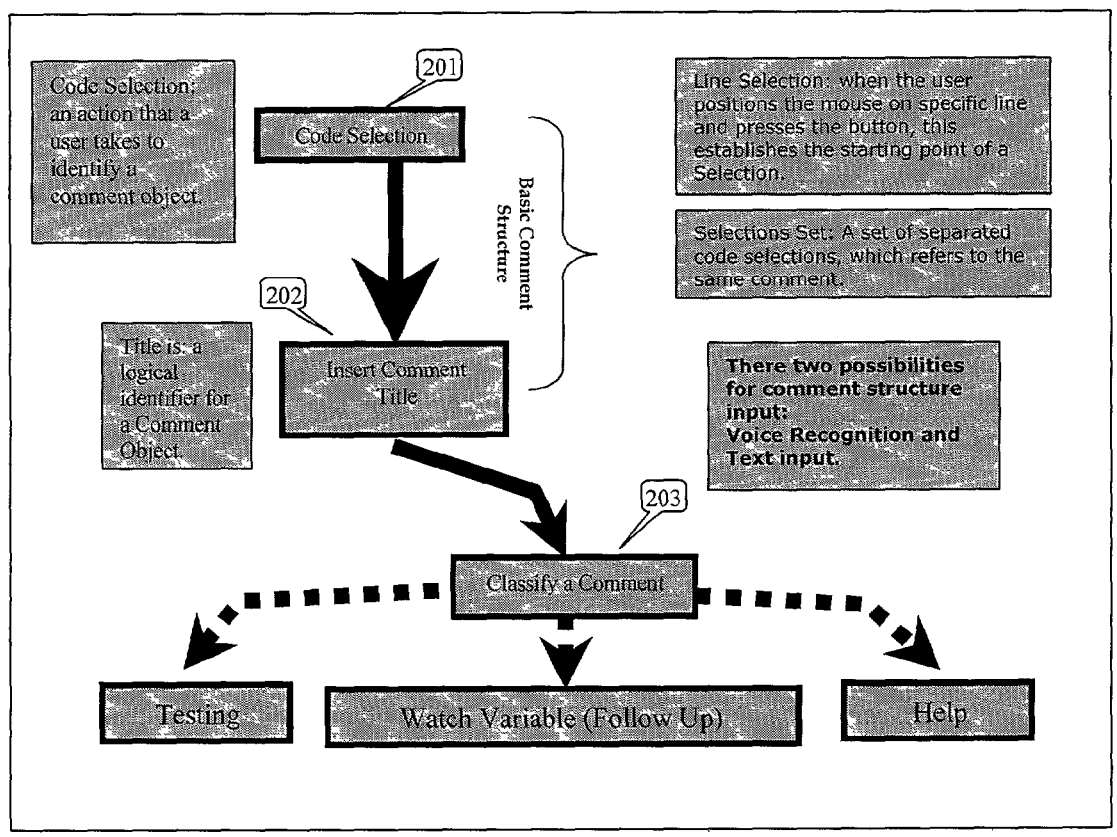
Figure 2: Comment entering process

Figure 3: Testing comment process
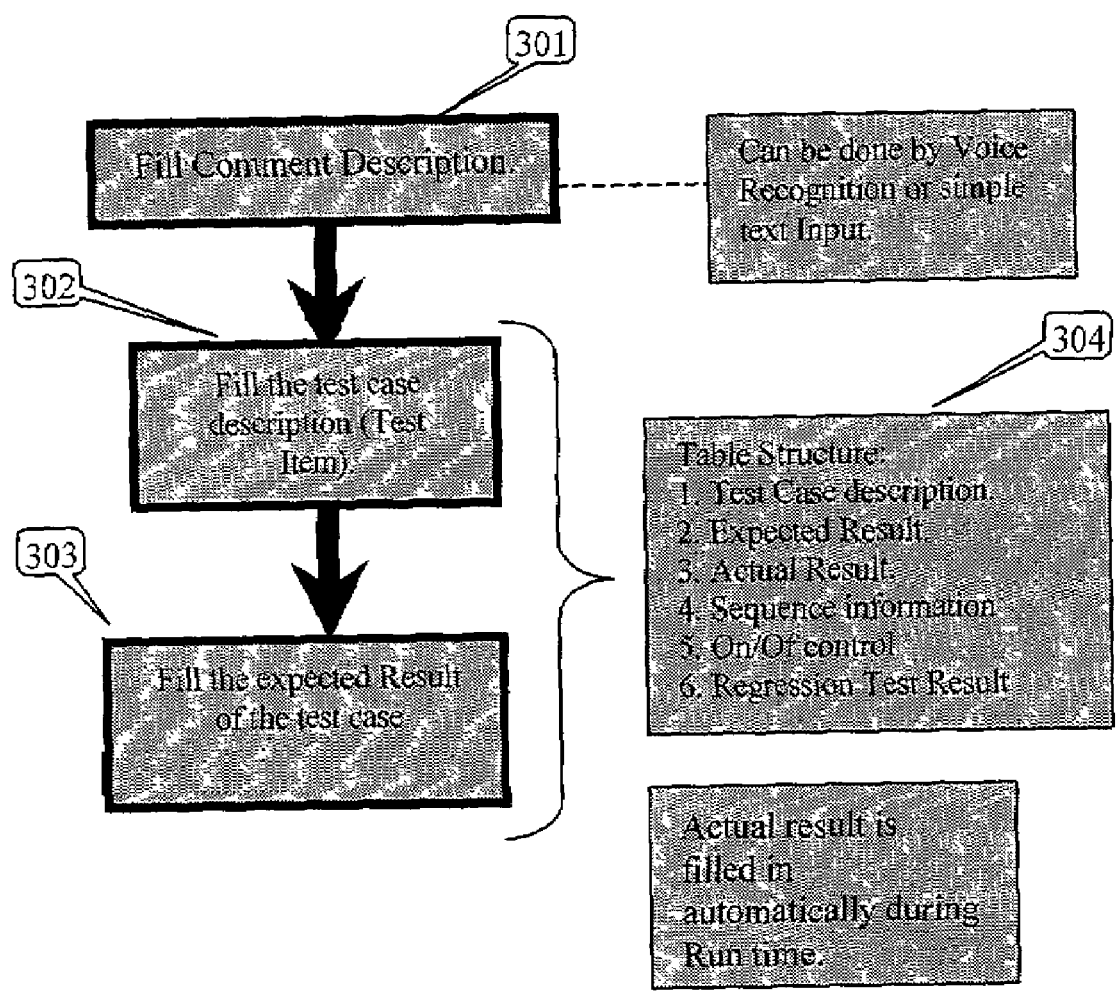

Figure 4: Watch variable comment process
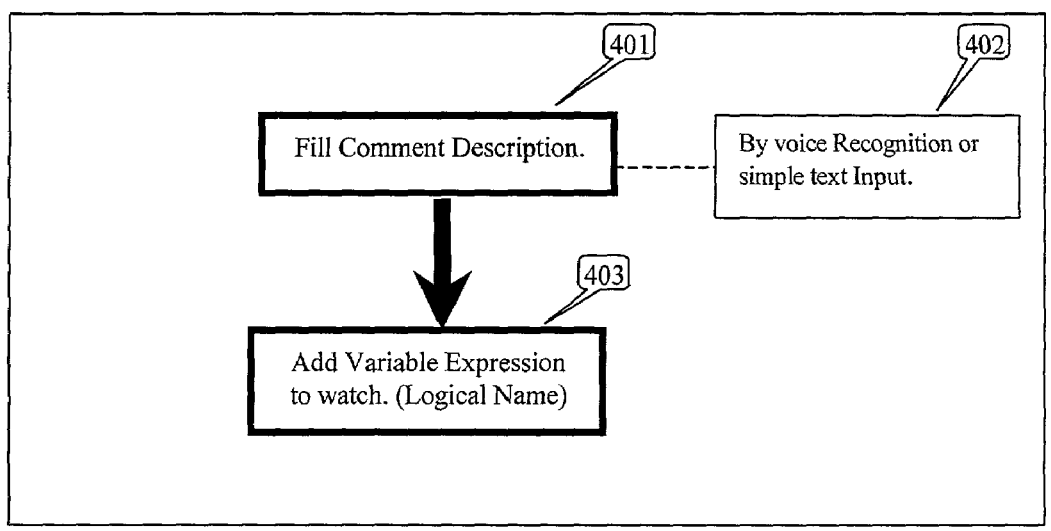
Figure 5: Help comment process
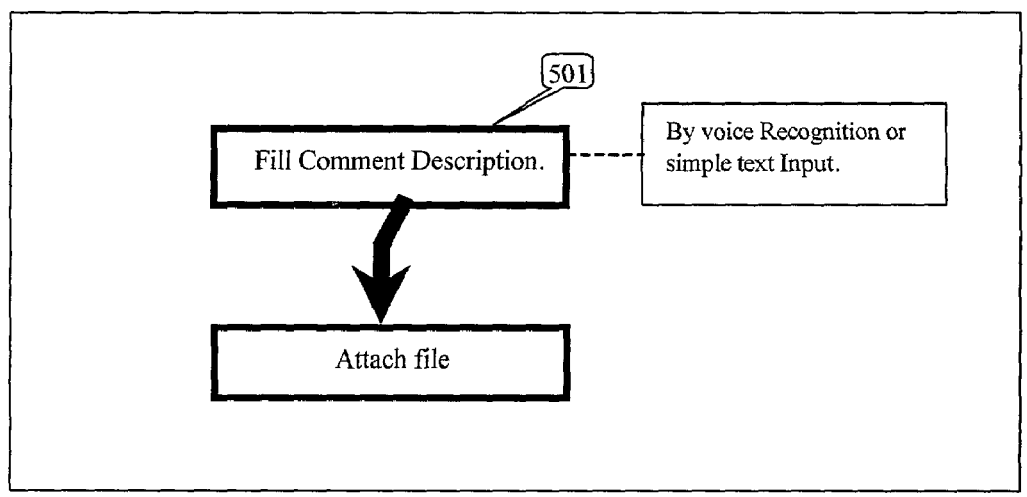

Figure 6: Grouping comments process
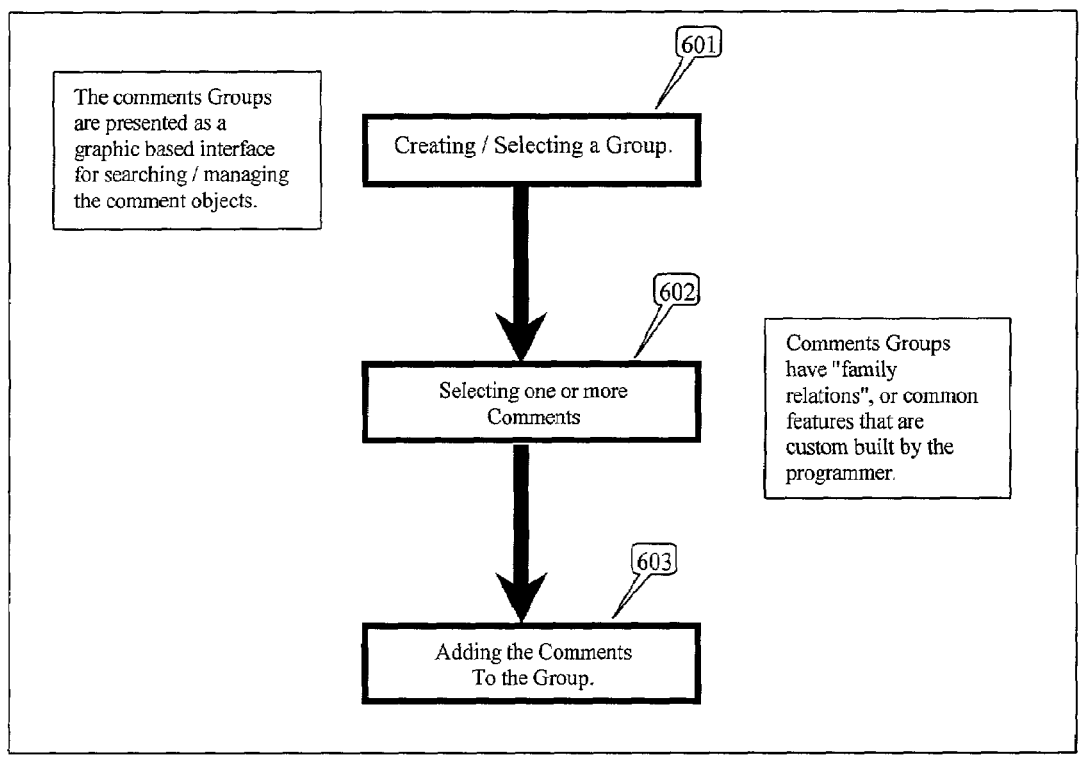

SOFTWARE CODE COMMENTS MANAGEMENT METHOD AND SYSTEM SUPPORTING SPEECH RECOGNITION TECHNOLOGY

FIELD AND BACKGROUND OF THE INVENTION

Background of the Invention

1. Field of the Invention

The invention relates to a system and method to support and improve software code writing and understanding, and in particular, to a software code comments management method and system supporting voice recognition technology in software programming.

2. Description of the Related Art

Computer programs often exhibit complex internal functional structures and information flows. Therefore, a person attempting to understand a program's internal behavior may face a difficult task. In many cases the program code, which is a machine language interface, is not clear enough for the programmer to review, and therefore, further explanations are required to understand it. A programmer often finds it quite difficult to understand how various blocks of program code are interrelated, or how a particular code segment is being used and will behave in a given situation. Thus, as the program code becomes more complicated, the requirements for code comments increase dramatically.

The writing and usage of comments is an important technique that contributes substantially to the development and maintenance of software. Comments are descriptive subject matter in a code segment, provided by the programmer in order to explain and illustrate various aspects related to the functioning and performance of the program code. For example, a programmer may program a certain function, and in this case, the programmer adds a comment (a textual aid) within the code that does not affect the running of the code, but which helps any programmer or other related person understand the design of a code segment, its concept of operation and functioning. A user-friendly and maintainable comment mechanism allows programmers to most advantageously edit and maintain the program code, during the program's lifecycle. This comment mechanism consumes less time for deciphering complex constructions, and serves to minimize the learning, searching and debugging time.

There are various text editor applications that enable voice recordings that are used as comments. Such a feature, for example, can be found in Microsoft Word 2000.

However, no known text editors applications operate as a part of a development environment, and neither do they interact with the software program operators and operands, or support development environment features, such as variables or expressions watch during debug or program tracing. Moreover, no known mechanisms support special management of comments' options like classifying comments into categories for different dedicated planned interactions with the program code during software maintenance, inspection, testing and running, or any other user custom needs and management methods, such as organizing several comments into one or more groups.

Finally and most importantly, no known technology or application provides a voice recognition engine for entering, editing and managing comments by a natural speaking language, in real time (code execution) and design time (code creation) simultaneously with the code editing.

SUMMARY OF THE INVENTION

The invention provides a system and method for organizing and managing program code comments, supported by voice recognition and text to speech technology, during software developing lifecycle. This system and method enables editing of comments in code segments, supported by voice recognition, organizing them and pronouncing them during code creation, editing, testing and debugging. The associated comments may be used to navigate in the code, in order to enable the user to more easily identify and understand a certain code segment. Comments can be organized and managed into groups of comments, in any desirable structure defined by the programmer. An explorer-type interface, which is a multimedia user interface (that includes a graphic user interface that responds to voice commands), is used for easily navigating code segments and comments, in order to identify and interact with the desirable part of the code segment. Comments on code segments, according to the invention, can be classified into different categories, such as Help comments, Testing comments and Watch variables comments. These categories will be further described.

According to the invention, all of the above-mentioned functionalities can be interacted with a plurality of languages, and effectively managed, by using voice recognition or any other input mechanism such as a keyboard.

According to the present invention the system include the following five elements:
  i. A voice recognition module, including a speech to text component and a text to speech component.
  ii. A multimedia user interface.
  iii. A management module that performs the following tasks:
    Editing of the comments.
    Relating and interfacing comments with appropriate code segment for intended interaction
    Dynamic code changes tracing and relevant updating of the comments
    Searching for comments and Navigating in the code segment.
    Classifying comments in defined groups.
    Browsing and monitoring comments.
  iv. A database (storage) module for storing the required comments, and other system and method data and control information.
  v. A mechanism for triggering, enabling pronunciation and/or display of comments to the programmer or tester.

The present invention enables the programmer to add comments by voice recognition technology, supported by a plurality of languages. In that way the programmer can simultaneously create (edit) the program code and add relevant comments by simply saying the comment in his natural language. The spoken comment is converted to text and referred to the current or selected written code segment. Added comments can then be translated to any desirable language, as text or as an audio format.

The present invention enables monitoring the comment by displaying or pronouncing it, in the separately stored original programmer voice and language, or in a digitized text to speech mechanism in a computer generated voice. Moreover, the desired comment can be displayed and pronounced in the appropriate language selected by the programmer or tester.

The present invention enables applying certain attributes to each comment, which allows using an added comment for other programming needs. There are several different uses of these attributes, classified in the following categories:

1. Help comments—Allows the use of the comments for a wide description help, that can be associated with verbal explanations, figures, links to other references (such as URLs), etc.
2. Watch variable comments—Allows to follow the execution of the program in real time. When the specific code referred to the comments is being executed, comments are being displayed or pronounced. This attribute enables the user to control and monitor the progress of the program execution or the variables value, while simultaneously working with the program. This is especially important when the program is being tested or debugged, as the bugs or errors are detected at an early stage and the user/programmer is able to experience them as soon as they appear.
3. Testing Comments—allows defining test cases and appropriate expected result in accordance with the program flow for program testing.

The approach of the invention to the problem of code comments includes the managing of comments into groups, according to comment function. This management helps organizing the comments in a manner that can help code maintenance, and makes it more flexible. Grouping of comments may be useful in the cases where several comments are an interrelated group of comments, a comment refers to different code segments or one code segment refers to different comments. This structure of comments facilitates the code maintenance and usage, and helps to overcome the difficulties in understanding the program code.

All said functionalities of the present invention provide a mean for improving the work efficiency of programmers, and allow a natural and more precise expression of what was the programmer's intention when writing the code. The ability of the programmer to say the comments content instead of writing it, unleashes the programmer to better express himself, and consumes less time.

The capability of listening to written code comments while browsing a program code, allows the programmer to productively and efficiently understand and learn the functionality of the browsed code segments, and thereby enabling the user to focus on the program, and not waste otherwise productive time by excessive effort for searching and understanding different code segments.

BRIEF DESCRIPTION OF THE DRAWINGS

The invention is herein described, by way of example only, with reference to the accompanying drawings, wherein:

FIG. 1 is an illustration of the components.

FIG. 2 is an illustration of the process of entering a comment, and all the optional comment classifying options.

FIG. 3 is an illustration of a Testing comments process.

FIG. 4 is an illustration of a watch variable comment process for following up variables and expressions.

FIG. 5 is an illustration a help comment process.

FIG. 6 is an illustration of creating a group of comments, or relating a comment to a group process.

DESCRIPTION OF THE PREFERRED EMBODIMENT

The following description is presented to enable one of ordinary skill in the art to make and use the invention as provided in the context of a particular application and its requirements. Various modifications of the preferred embodiment will be apparent to those with skill in the art, and the general principles defined herein may be applied to other embodiments. Therefore, the invention is not intended to be limited to the particular embodiments shown and described herein, but is to be accorded the widest scope consistent with the principles and novel features herein disclosed.

The principles and operation of a system and a method according to the present invention may be better understood with reference to the drawings and the accompanying description. Note that these drawings are given for illustrative purposes only and are not meant to limit all said patent features.

The present invention, as illustrated with reference to FIG. 1, is comprised of the following elements:

i. A multimedia user interface (100), for entering comments, using voice recognition technology.
ii. A comment management component (101), which includes the following modules:
  a. A comment browsing module (109).
  b. A comment editing and classification module (107).
  c. A comment grouping module (108).
  d. A code changes tracing for related comments updating module (113).
iii. A vocal processing engine (102) which includes both Text to Speech (TTS) and Voice Recognition (VR) engines, for converting text into a computer generated voice, and spoken words into text.
iv. A database storage module (103) for storing system data and control information.
v. A comment displaying module (104) for pronouncing and/or displaying comments to a user, using text, or computer generated voice (text to speech technology), or human original voice.
vi. A watch variable comments monitoring module (105) for monitoring desired watch variables or expressions.
vii. A testing comments monitoring module (106) for monitoring desired test items, and filling the actual result column in each test item.

As illustrated in FIG. 1, the present invention interacts with the following components:

i. A development environment (110), which is the environment where the programmer/user composes its software code.
ii. Input mechanisms (112) such as microphone and keyboard.
iii. Output mechanisms (111) such as speakers and screen.

The present invention components, as can be seen in FIG. 1, describe a system that integrates with a developing environment (110), as an add-in application. The add-in application uses a Multimedia User Interface (MUI) module (100), which enables interfacing it with various input mechanisms (112) such as a keyboard or a microphone, and outputting data, using one or more output mechanisms (111) such as a screen or speakers.

The add-in application contains a comments management module (101), which enables browsing, searching, monitoring (109), editing and classification (107), grouping (108) of comments and code changes tracing for related comments updating module (113), which enables maintaining a correlation between comment's objects and related code segments, for example, by a cyclic redundancy check of said related code segment. Through this module, the add-in application displays the comments hierarchy, in a tree-like browser. The hierarchy is freely built by the programmer suitable to his requirements. This tree-like browser is a powerful tool for searching and editing comments.

The add-in application uses a method of voice recognition (VR) and text to speech (TTS) technology (102). Voice recognition provides an efficient and natural way of adding and editing comments. By freely saying the wanted comment content, in different languages, a voice recognition technology is converting the said words into text, in the desired language, using translation software if necessary. The text to speech technology enables the programmer to hear the comments content, thus, allowing him an easy and convenient way to understand the written software code.

The said technology (text to speech & voice recognition) is also used as a displaying mechanism (104) which helps tracking program progress and variable values. While running the program, the appropriate comments can either be displayed on the screen or be pronounced in the original programmer voice, or computer generated voice (text to speech).

The comments data and hierarchy as well as the control information are stored in a database module (103). The database module allows keeping persistence of all the data and information entered by the programmer, which includes all comments text and voice recorded input and processed results related to the code.

Comments on code segments, according to the invention, can be classified into one or more different categories, such as:

1. Help—Wherever a code segment appears to be complex, hard to understand or based on some algorithm, it requires a wider and richer comment description more than usually entered in the code text. Classifying a comment as a help comment, allows the programmer to attach to the comment an extended and rich description. This description can include a wide text explanation of the programmer, supported by voice recognition technology, pictures, audio files, other multimedia accessories, links to related references, etc. This related description is stored in the comments database (103). The Help category contains all needed descriptions that help to explain part of the code segment that the comment is related to.
2. Testing Comment—A comment that includes a test item that can be attached by the programmer to the said comment that refers to an appropriate code segment which functionality influences the flow of the application. For example, a condition that checks an input validation should output a suitable result of a valid and invalid input. The code segment that deals with the said example can be tested whether the actual output result is equal to the expected result. In such a case, the comment that describes the said code segment functionality can be classified as a testing comment. The test item includes a table that describes all the possible and planned test cases of the referred code segment. The table is comprised of at least three fields:
   i. Condition field—This field contains a variable or expression with a condition attached to it. For example, "x>0".
   ii. Expected result field—This field contains a variable value that is the correct result for the given expression. For example, "y=10" (which means, according to condition field, if "x" is greater than "0", "y" has to be equal to "10").
   iii. Actual result field—This field is filled in runtime process with the actual result of the variable that is mentioned in the expected result field. For example, "y=15", which means that the final result of "y" differs from the expected result.

Furthermore, additional fields to the above mentioned ones are possible to implement, such as: "Sequence and Order" field, which determines the sequence of test cases, "Test Case On/Of" field, which enables or disables the test case, "Regression Test" field, which enables comparing of the current test result with previous test results, as well as other test supporting data and control fields.

The testing comments help to provide an on-going quality control mechanism for the related code.
3. Watch variable Comments—A comment that is classified as watch comment contains one or more watch expressions or variables, which are related to the referred comment code segment, and are used to help following the functionality of the said code segment. A watch variable comment produces monitoring for the given watch expressions or variables, while debugging the said code segment, both in trace mode (step by step execution) or in run mode. Monitoring is done by displaying the expressions and their values, or by pronouncing it. An example of such an item is the case where "x indicates age" is a comment context, related to a code segment where "x" is a name of a value within it. When the code is executed, the comment will be displayed or pronounced as, "x indicates age, x equals 40".

All the comments categories (for example, Help comments, Testing comments and Watch Variable comments) are inherited from the general Comment Structure, so they contain a Title and Short Description, and can be pronounced and displayed using the pronouncing and displaying mechanism (104), further more, all comments are managed by the comment management component (101), and stored in the database (102).

Test items inspection and result check of testing comments are performed by the testing comments monitoring module (106), which keeps track of test cases conditions, and fills the actual result column in the test item table. This module operates when the software code is in runtime or debug mode in the development environment (110), and records the actual result while code execution reaches the code lines related to the testing comment with attached test item. The test item results table is stored in the database (103) and can later be reviewed using the comment browsing module (109).

Comments that are classified as watch variable comments are processed by the watch variable comments monitoring module (105), which produces output when the software code is in runtime or debug time in the development environment (110). The watch variable comments monitoring module then displays the output using the comment displaying module (104).

As can be seen in FIG. 2, there are two basic steps for adding comments:

Stage 1 refers to preparing the basic structure for the comment, and

Stage 2 (optional) refers to the optional classification of the comment.

The invention enables using textual and Voice Recognition technology Support to enter and manage comments.

According to step 1 (preparing the comment), the following must be executed:
i. Code Selection (201), which is an action executed by the user to identify a section of code. This entails line selection, where the user places the cursor on a specific line and presses the mouse/keyboard button, to establish the starting point of a selection (highlighting). The user can adjust the relevant selection by dragging, or by specifying the line numbers that are related to comment. Code selection can also be a set of separated code selections, which refers to the same comment.

ii. The comment title is entered (202) by the programmer and refers to the code selection. The title is a logical identifier for a Comment Object, and may be added using either Voice Recognition or Text input. The title is also used as a tag representing the comment, and may include a short or introductory description of the related (selected) code.

iii. The comment is being classified (203) to one or more of the available categories Following the comment preparation, a programmer may choose to command the system to select whether to pronounce the comment title in run time and/or debug mode, or not, which means that such comments may be displayed or pronounced for a user. The user can thereby read or listen to a comment that refers to the next code line to be executed. Comments that are being pronounced declare the next phase that is to be processed by the program. The comment can be pronounced by either computer generated voice or a recorded human voice.

FIG. 3 shows the flow of entering a test case item:

i. A comment description is filled in (301).

ii. A test item can include several test cases. For each test case entry, the programmer fills its description (302) and expected result (303), according to at least one of the variables in the selected code.

iii. The actual result is automatically filled in during runtime or debugging, by comparing the actual variable value result with the expected result. The resulting table (304) for the test case item includes:
Test case description
Expected result
Actual result
Sequence information
On/Of control
Regression Test Result Both the description and the expected results, as well as other information, can be added by voice recognition input and/or simple textual input.

FIG. 4 illustrates the composing of Watch variable comments, for variable follow up. According to the invention, the programmer fills in a comment description/title (401), either by voice recognition or by entering a text input (402). The programmer subsequently adds the variable expression which is to be watched (403), according to its logical name that appears in the code segment. The programmer selects whether to pronounce the item (variable or variable expression) value in run time or debug mode.

In run time or debug mode execution, whenever the program executes code segment that contains a watch item, the value of the item is being displayed and/or pronounced in a computer-generated voice.

FIG. 5 illustrates the composing of help comments, according to the invention, wherein a programmer fills in a broad description/title (501), either by voice recognition technology or text input. Alternatively, the user can add a link to a text file, bitmap file, website, etc.

Comments may be displayed or pronounced in various ways, such as:

i. Displaying a comment by its group (FIG. 6), or next to the code line, for reading and understanding the code.

ii. Displaying the comment by hearing it:
Playing it in the design time (while writing the code). This may include displaying the text-based comment as a computer-generated voice or human voice, depending on how the comments were entered into the code, or as determined by the programmer, for better understanding the comment.

Playing the comment in debug time or runtime, as a computer-generated voice or human voice. While debugging the application, the comment, which is related to the next code line/scope that is being executed, is pronounced for code execution progress monitoring.

According to the present invention, comments can be searched for in the following ways:

i. Finding a comment by a key word.

ii. Using the comments navigational interface, which is a multimedia user interface (that includes a graphic user interface that responds to voice commands), for editing and displaying comments. This navigational interface displays all the comments and comments groups (FIG. 6) in an explorer type interface. This interface provides the programmer an efficient interaction with all the comments that have already been entered, and allows finding the right code scope/line that is related to the comment that appears in the navigation interface. The hierarchy of groups and comments being displayed in the explorer type interface, is built and managed by the programmer, according to whichever structure he desires.

FIG. 6 also illustrates an additional embodiment of the invention, which is joining several comments of Help, Test, Watch or any other categories, into a group. Comments that are joined can relate to one or more different parts of a code segment. Grouping comments is a technique that helps the programmer to better edit, navigate, manage and understand his/her code and better understanding the relationship between comment objects. An example of a group is a collection of comments that relate to implementing an arithmetical formula.

FIG. 6 shows the flow of grouping comments. The flow comprises the steps of:

i. Using an interface to add a group (601), which includes creating/selecting a group folder.

ii. Selecting at least one comment (602) to be added to a group.

iii. Add all selected comments to the created/selected group (603).

This flow (FIG. 6) can be repeated in order to add additional comments to groups.

The groups and comments can be displayed in an explorer type interface, which contains a hierarchical tree like structure view. The hierarchy of the tree like structure is built according to the programmer's comments grouping methodology. This hierarchical interface allows the programmer to display the tree like structure in different criterions, such as alphabetical order, themes, importance, chronological order, hierarchical order etc. In this way, the programmer can find comments by simply querying the explorer type interface and displaying the groups and comments that match the requested criteria of the query, and accordingly may be addressed in different Code Segments, for editing the related code line/scope of a selected comment.

The method of generating a group comment can alternatively be executed by Code Segment Demarcation, such that all comments relating to a selected code segment can form to a single group.

All operations on comments and groups such as editing, deleting, and managing, can be done using the voice recognition technology on the multimedia interface. The method of Editing, for example, can be provided by an Interactive Menu response of the said multimedia interface to Voice Orders. For example, "Add Comment", "Edit Comment", "Open Group" or "Cancel" voice commands can be used to manage the group or comment. This means that a comment in the said interface is linked with the related code segment line, and can be easily edited, viewed, listened to and otherwise managed.

The foregoing description of the embodiments of the invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. A software code comments management system operating with and within a software code development environment and able to interact dynamically with the code segments, variables and characteristics, the system comprising:
   a multimedia user interface that includes a graphic user interface that responds to voice commands;
   a comment management component, for managing the comments;
   a speech recognition module operatively connected to said multimedia user interface;
   a database system for storing system data and control information; and
   an output mechanism for outputting the comments or comments-code interaction results;
   wherein said comment management component enables classifying comments into comments categories from the group comprising of: Help comments, Testing comments and Watch variable comments;
   wherein said testing comments are used for quality control programs including:
   integrating a test table structure with a comment object that specifies at least one test case for the code segment related to said comment;
   automatic processing of the actual result for each said at least one test case in run time;
   controlling the automatic test processing with the ability to plan to test all the cases, or part of them, or not to test at all;
   evaluation of the value expressions in each said at least one test case in run time;
   generating a test design document from said comment; and
   generating a test result report from said automatic processing of the actual result.

2. A software code comments management system operating with and within a software code development environment and able to interact dynamically with the code segments, variables and characteristics, the system comprising:
   a multimedia user interface that includes a graphic user interface that responds to voice commands;
   a comment management component for managing a plurality of comments;
   a speech recognition module operatively connected to said multimedia user interface;
   a database system for storing system data and control information; and
   an output mechanism for outputting the comments or comments-code interaction results;
   wherein said comment management component enables classifying comments into comments categories from the group comprising of: Help comments, Testing comments and Watch variable comments;
   wherein said watch variable comments enable follow up of variables and expressions values including:
   adding to a comment at least one reference to code variables, to be displayed for tracing and debugging;
   adding a description for every variable, to be displayed when evaluated;
   displaying said evaluated variable by pronouncing said added description and said evaluated expression of said watch item while running a program in debug mode and running mode;
   adding to a comment at least one reference to code expression, to be displayed for tracing and debugging;
   adding a description for every expression, to be displayed when evaluated; and
   displaying said evaluated expression by pronouncing said added description and said evaluated expression of said watch item while running a program in debug mode and running mode.

* * * * *